(12) United States Patent
Utaka et al.

(10) Patent No.: US 8,921,736 B2
(45) Date of Patent: Dec. 30, 2014

(54) METHOD OF WELDING COIL END OF STATOR OF ELECTRIC ROTATING MACHINE

(75) Inventors: Ryosuke Utaka, Takahama (JP); Atsuo Ishizuka, Nagoya (JP)

(73) Assignee: Denso Corporation, Kariya (JP)

( * ) Notice: Subject to any disclaimer, the term of this patent is extended or adjusted under 35 U.S.C. 154(b) by 651 days.

(21) Appl. No.: 13/091,430

(22) Filed: Apr. 21, 2011

(65) Prior Publication Data

US 2011/0259863 A1    Oct. 27, 2011

(30) Foreign Application Priority Data

Apr. 21, 2010 (JP) .................. 2010-097964

(51) Int. Cl.
  *B23K 33/00*  (2006.01)
  *B23K 9/12*   (2006.01)
  *B23K 9/00*   (2006.01)
  *B23K 9/167*  (2006.01)

(52) U.S. Cl.
  CPC .............. *B23K 9/0026* (2013.01); *B23K 9/167* (2013.01); *B23K 2201/38* (2013.01)
  USPC .................................. 219/137 R; 219/125.11

(58) Field of Classification Search
  USPC ............... 219/125.11, 137 R, 137 PS, 75; 29/596–598, 732, 735
  See application file for complete search history.

(56) References Cited

U.S. PATENT DOCUMENTS 6,181,044 B1   1/2001  Umeda et al.
6,834,422 B2 * 12/2004  Kato ........................ 29/596

FOREIGN PATENT DOCUMENTS

JP       2000-166150       6/2000

OTHER PUBLICATIONS

Office Action (1 page) dated Aug. 20, 2013, issued in corresponding Japanese Application No. 2010-097964 and English translation (1 page).

* cited by examiner

*Primary Examiner* — Sang Y Paik
(74) *Attorney, Agent, or Firm* — Nixon & Vanderhye P.C.

(57) ABSTRACT

A method of welding a plurality of conductors to form a winding extending through an annular stator core. The conductors are inserted into slots formed in the stator core to have coil ends extending outside an end surface of the stator core. A plurality of pairs of the coil ends are arranged in diagonal arrays extending diagonally with respect to a radial direction of the stator core. The method inserts a first electrode into a gap between adjacent two of the diagonal arrays and then brings a second electrode close to one of the adjacent two of the diagonal arrays to arc-weld the pairs of the coil ends. This welding method enables the welding of the coil ends arrayed in the above layout efficiently while keeping the electrical insulation between the pairs of the coil ends.

9 Claims, 12 Drawing Sheets

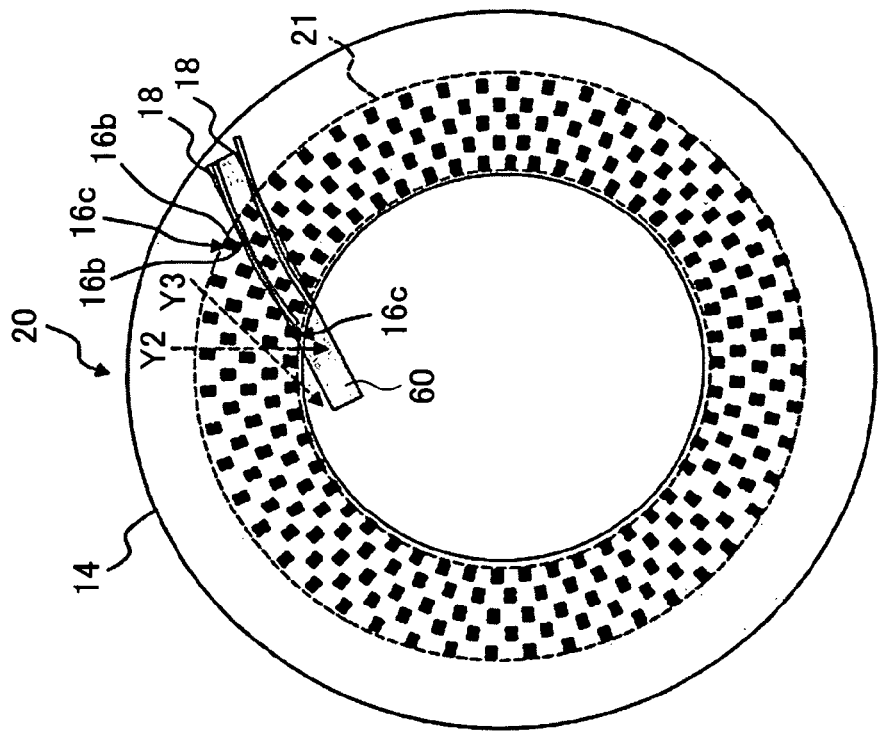
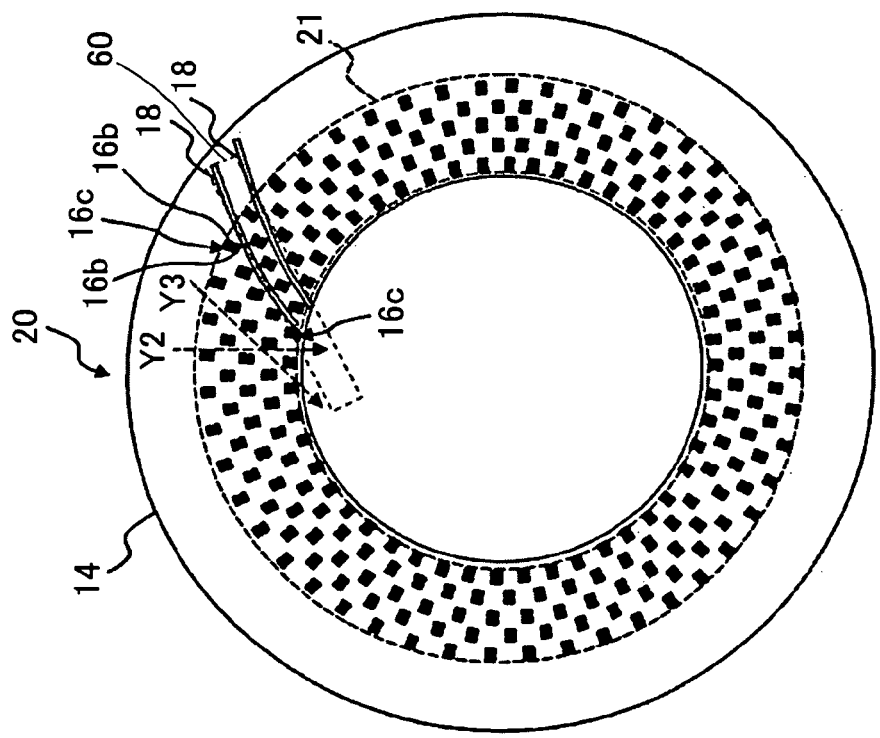

METHOD OF WELDING COIL END OF STATOR OF ELECTRIC ROTATING MACHINE

CROSS REFERENCE TO RELATED DOCUMENT

The present application claims the benefit of Japanese Patent Application No. 2010-97964 filed on Apr. 21, 2010, the disclosure of which is incorporated herein by reference.

BACKGROUND OF THE INVENTION

1. Technical Field

The present invention relates generally to a method of welding a coil end of a stator of an electric rotating machine such as an electric motor, an electric generator, or a motor-generator to be mounted in electric vehicles or hybrid vehicles.

2. Background Art

FIG. 1 illustrates a conventional stator 10 for use in electric rotating machines. The stator 10 includes an annular stator core 14 and a plurality of stator windings 16. The stator core 14, as illustrated in FIG. 2, has a plurality of slots 12 arrayed at regular intervals in a circumferential direction thereof. The stator windings 16 are wound through the slots 12 of the stator core 14. Each of the stator windings 16 is made up of a plurality of U-shaped conductors 16a inserted into the slots 12, for example, from the lower side of FIG. 1. Ends of the U-shaped conductors 16a extend outside an upper end, as viewed in FIG. 1, of the stator core 14 and are arrayed coaxially. Each of the U-shaped conductors 16a is twisted so that radially adjacent two ends 16b of the U-shaped conductors 16a extend in opposite circumferential directions of the stator core 14 to form a coil end pair 16c of the U-shaped conductors 16a which are to be welded together. The pairs 16c are, as can be seen from FIG. 1, arranged at regular intervals in the circumferential direction of the stator core 14 in coaxial circular lines and also aligned radially in a plurality of lines.

The coil ends 16b of each pair 16c may be joined by, for example, TIG (Tungsten Inert Gas) welding. This is achieved by inserting, as illustrated in FIG. 3, each negative electrode 18 of a TIG welding system in a direction Y1 from outside the circumference of the stator core 14 fully into a gap between every adjacent two of arrays of the coil ends 16b which extend in a radial direction of the stator core 14 and placing positive electrodes (not shown) from a direction perpendicular to the drawing (i.e., from above the coil ends 16b) close to the coil end pairs 16c. This is very efficient in that the arrays of the coil ends 16b which extend radially of the stator core 14 can be welded at once. However, if the distance L1 between radially adjacent two of the coil end pairs 16c along the surface of the end of the stator core 14 is not great enough to ensure electrical insulation therebetween, it may result in electrical discharge.

In order to prolong the distance L1, U.S. Pat. No. 6,181,044 B1 (corresponding to Japanese Patent First Publication No. 2000166150) filed on Nov. 16, 1999, assigned to the same assignee as that of this application, teaches a zigzag alignment of the coil end pairs 16c, as illustrated in FIG. 4. Specifically, an outer one 16c-1 of each radially adjacent two of the coil end pairs 16c is placed out of alignment with an inner one 16c-2 in the radial direction of the stator core 14. Such zigzag alignment results in increases in distance L2 between two of the coil end pairs 16c which are located adjacent each other in the radial direction of the stator core 14 and distance L3 between adjacent two of the coil end pairs 16c of the circumferentially extending arrays.

The zigzag arrangement of the coil end pairs 16c, however, encounters the drawback in that some of the coil end pairs 16c, as can be seen from FIG. 4, will obstruct the full insertion of the negative electrodes 18 of the TIG welding system from the direction Y1 into the gaps between the radially extending arrays of the coil ends 16b of the U-shaped conductors 16a.

SUMMARY

It is therefore an object to provide a welding method of welding coil ends of a stator of, for example, an electric rotating machine which are so arrayed as to ensure a desired magnitude of electrical insulation between pairs of the coil ends to be welded.

According to one aspect of an embodiment, there is provided a method of welding a plurality of conductors to form a winding extending through an annular stator core. The conductors are inserted into slots formed in the stator core to have coil ends extending outside one of opposed end surfaces of the stator core. A plurality of pairs of the coil ends are arranged in a circumferential direction of the stator core and also staggered in zigzag alignment in a radial direction of the stator core so as to form diagonal arrays of the pairs of the coil ends. Each of the diagonal arrays extend diagonally with respect to the radial direction of the stator core. The method comprises: (a) inserting a first electrode of a welding system into a gap between adjacent two of the diagonal arrays; and (b) bringing a second electrode close to one of the adjacent two of the diagonal arrays to weld the pairs of the coil ends.

The above layout of the pairs of the coil ends results in increases in distance between two of the pairs of the coil ends which are located adjacent each other in the radial direction of the stator core and distance between adjacent two of the coil ends of the diagonal, arrays as compared with the structure, as illustrated in FIG. 3. The above welding method is useful in welding the coil ends arrayed in the above layout efficiently while keeping the electrical insulation between the pairs of the coil ends.

In the preferred mode of the embodiment, the first electrode may be made of two discrete electrode strips. One of the electrode strips is inserted into the gap from outside the stator core, while the other electrode strips is inserted into the gap from inside the stator core in alignment with the one of the electrode strips. This structure facilitates the placing of the electrode strips within the gap.

The first electrode may alternatively be made of two discrete electrode strips. The two electrode strips are inserted into the gap so that they are disposed substantially parallel to each other. This structure also facilitates the placing of the electrode strips within the gap.

The pairs of the coil ends are arranged in the circumferential direction of the stator core in coaxial circular arrays. The pairs of the coil ends of each of the coaxial circular arrays are disposed at regular intervals to have the diagonal arrays located at regular intervals away from each other in the circumferential direction of the stator core. Such an orderly layout permits the coil ends of all the diagonal arrays to be welded within a decreased time.

Each of the diagonal arrays may be curved at a given radius of curvature. In this case, it is preferable that the first electrode is curved at the given radius of curvature. This ensures the direct contact of the first electrode with the diagonal array of the coil ends.

Each of the diagonal arrays may extend straight. In this case, it is preferable that the first electrode extends straight. This ensures the direct contact of the first electrode with the diagonal array of the coil ends.

The first electrode has a width greater than those of the gaps, so that the first electrode is placed in contact with both adjacent two of the diagonal arrays.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 8(a) and 8(b) are plane views which demonstrate how to weld the coil ends of FIG. 5.

DESCRIPTION OF THE PREFERRED EMBODIMENTS

Figure 5:
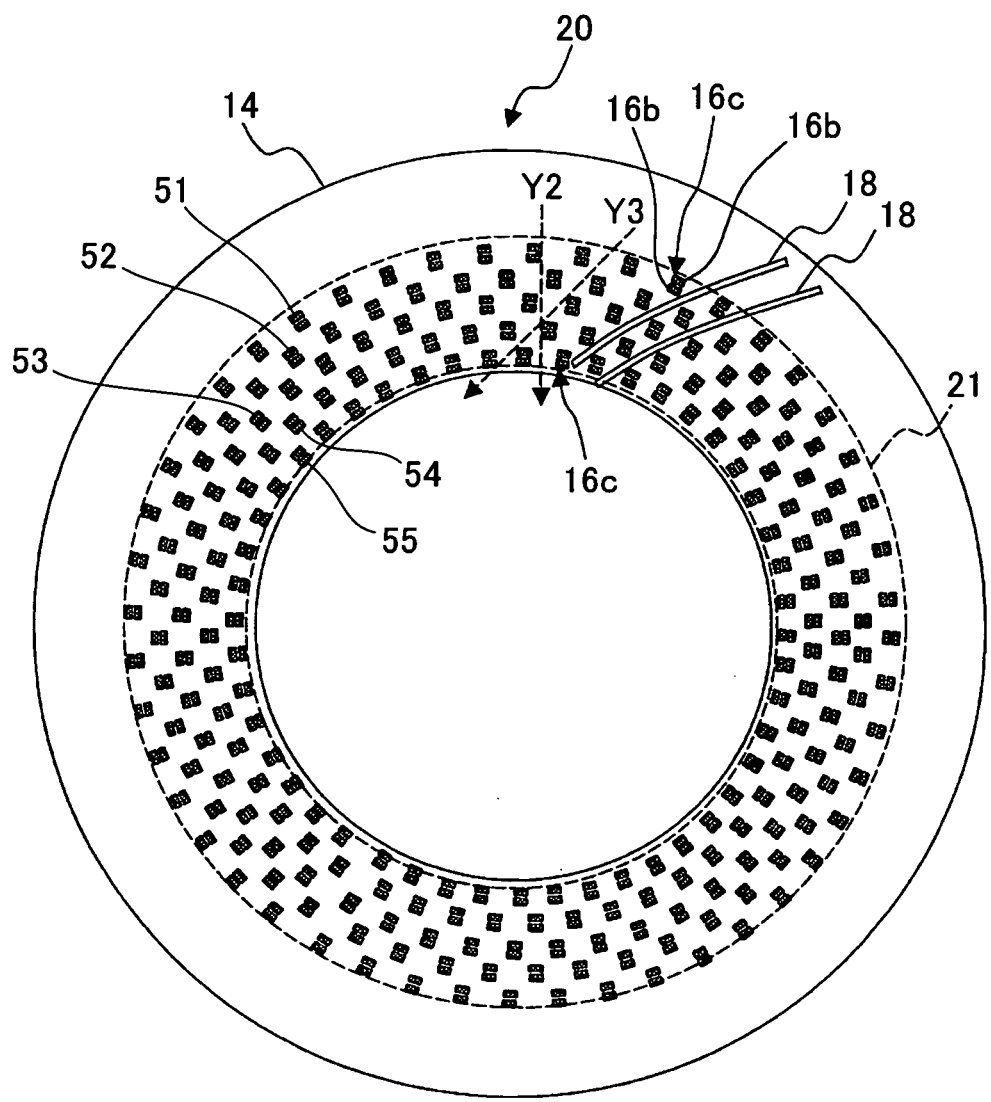
FIG. 5 is a plane view which shows the layout of coil ends to be welded on an end surface of a stator core according to an embodiment.

Referring to the drawings, wherein like reference numbers refer to like parts in several views, particularly to FIG. 5, there is shown a stator 20 for use in an electric rotating machine as an electric motor, an electric generator, or a motor-generator to be mounted in electric vehicles or hybrid vehicles according to an embodiment of the invention.

Figure 1:
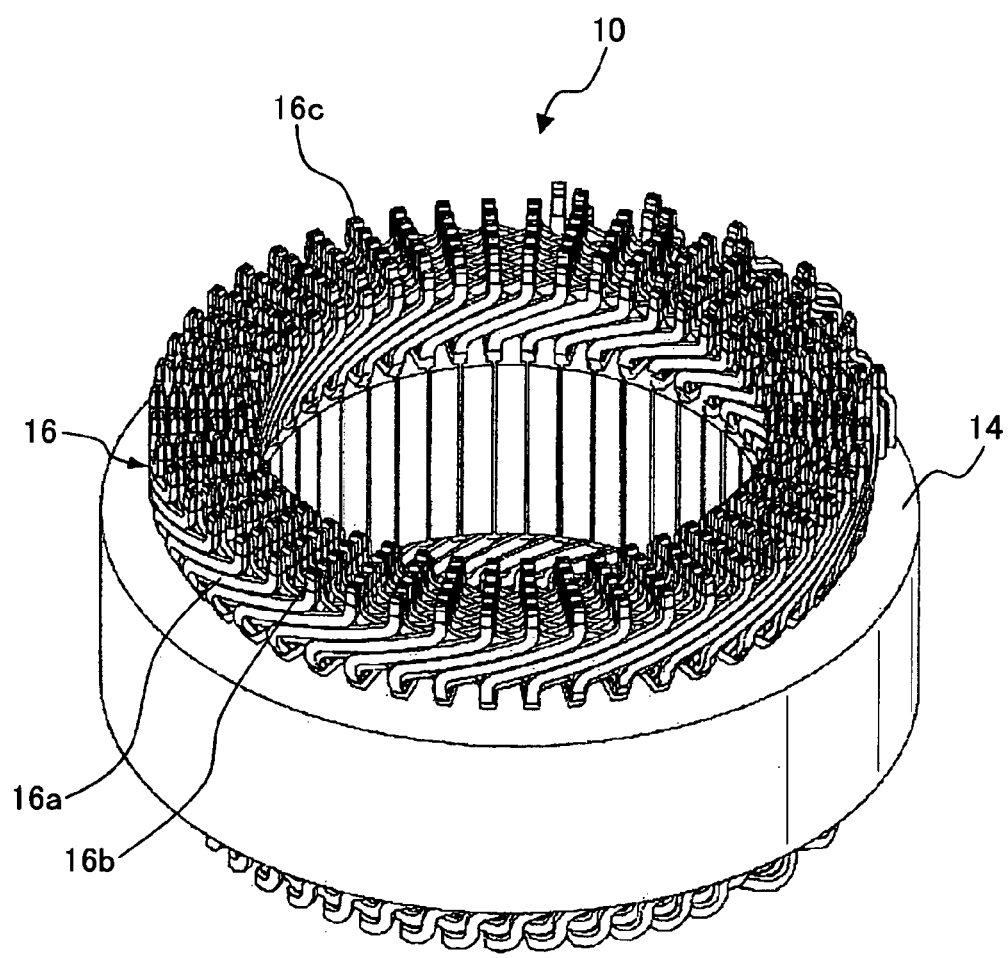
FIG. 1 is a perspective view which shows a prior art stator.
Figure 2:
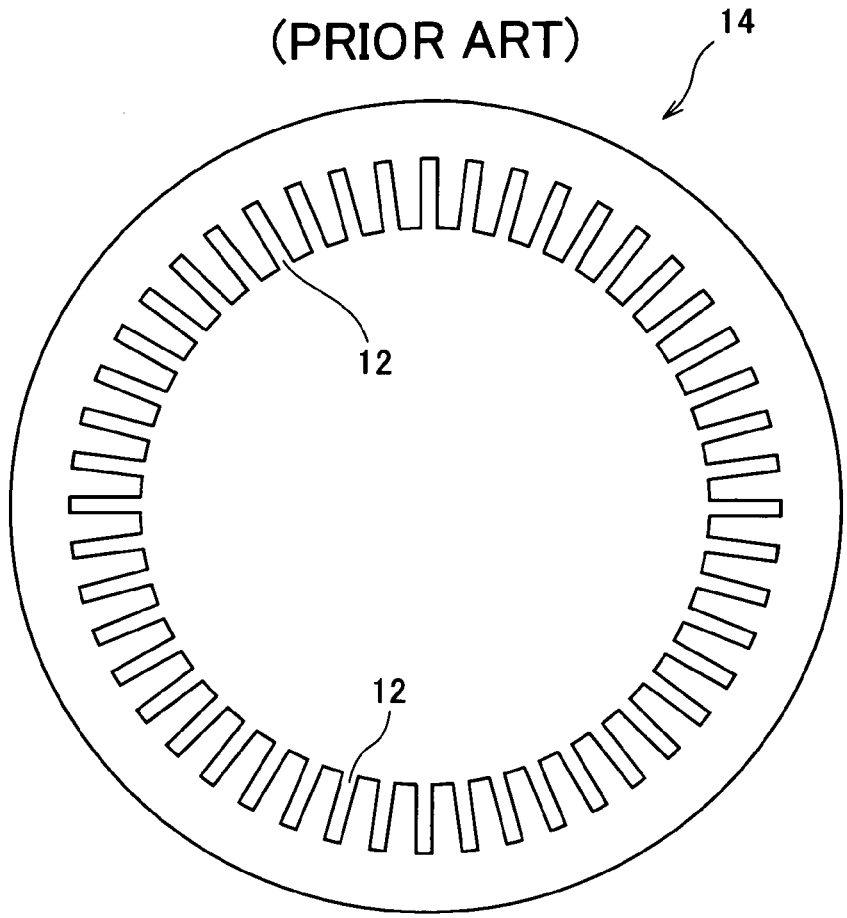
FIG. 2 is a plane view which shows a stator core of the stator of FIG. 1.
Figure 3:
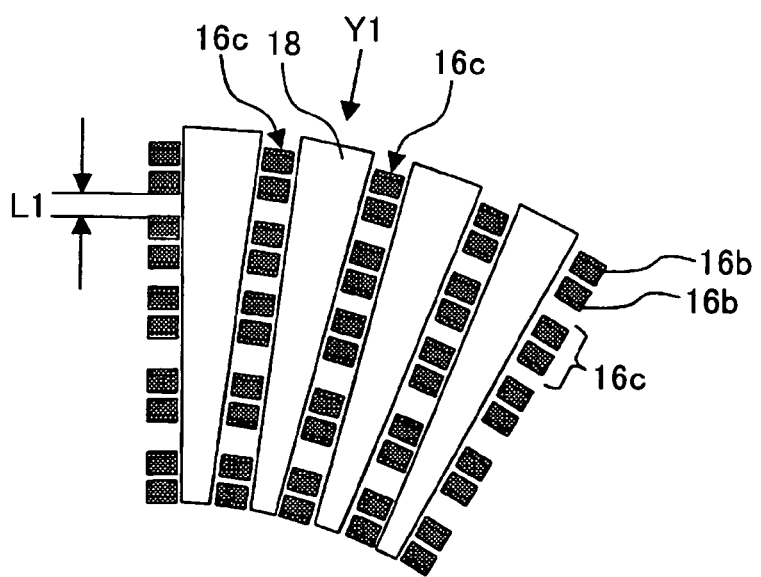
FIG. 3 is a partially enlarged view which shows the layout of coil ends of a stator winding of the stator of FIG. 1 which are to be welded.

The stator 20 includes a stator core 14 and stator windings 21. The stator core 14 has the same structure as illustrated in FIG. 2. Specifically, the stator core 14 is of an annular shape and has a plurality of slots 12 (e.g., 48 slots 12 in FIG. 2) formed in an inner periphery thereof and arrayed at regular intervals in a circumferential direction of the stator core 14. The stator windings 21 are wound through the slots 12 of the stator core 14. Broken lines schematically represent the stator windings 21 for the simplicity of illustration. Each of the stator windings 21 is made up of a plurality of U-shaped conductors which are, like in FIG. 1, inserted into the slots 12 from the reverse side of FIG. 5. The U-shaped conductors may be implemented by ones, as disclosed in U.S. Pat. No. 6,181,044 B1 assigned to the same assignee as that of this application, disclosure of which is incorporated herein by reference. Ends of the respective U-shaped conductors extend outside a front end surface, as viewed in FIG. 5, of the stator core 14 to a given height and are arrayed coaxially. Each of the U-shaped conductors is so twisted, like in U.S. Pat. No. 6,481,044 B1, that radially adjacent two ends 16b of the U-shaped conductors extend in opposite circumferential directions of the stator core 14 to form a coil end pair 16c of the U-shaped conductors which is to be welded together. The pairs 16c are, as can be seen from FIG. 5, arranged in the circumferential direction of the stator core 14 in coaxial circular lines and also staggered or zigzag aligned in a radial direction of the stator core 14.

In the structure illustrated in FIG. 5, the coil end pairs 16c of the U-shaped conductors are arranged in five circumferential arrays: a first array 51 to a fifth array 55. The coil end pairs 16c of each of the first to fifth arrays 51 to 55 are arranged at regular intervals in the circumferential direction of the stator core 14. Radially adjacent respective ones of the coil end pairs 16c of the first to fifth arrays 51 to 55, as can be seen form FIG. 5, form an array, as indicated by a line Y3, which is inclined at a given angle (except 0° and 90°) to a line Y2 extending parallel to the radial direction of the windings 21 (i.e., the stator core 14). In other words, the coil end pairs 16c are arranged in diagonal arrays at a regular interval in the circumferential direction of the stator core 14. Each of the diagonal arrays extends diagonally with respect to the radial direction of the stator core 14. In the example of FIG. 5, each of the diagonal arrays is, as can be seen in FIG. 5, slightly curved.

Welding of the coil ends 16b of each of the coil end pairs 16c is achieved, as illustrated in FIG. 5, by inserting a negative electrode 18 fully into a gap between adjacent two of the diagonal arrays of the coil end pairs 16c from outside the stator windings 21 and bringing a positive electrode, as will be described later in detail, close to the coil ends 16b to arc-weld the coil ends 16b together. Only the two negative electrodes 18 are shown in FIG. 5 for the simplicity of illustration, but, as many negative electrodes 18 as there are gaps between the diagonal arrays are used to weld all the coil end pairs 16c. Each of the negative electrodes 18 is inserted into the gap until it passes through the first to fifth arrays 51 to 55 fully. The coil ends 16b of each of the coil end pairs 16c is joined by the arc welding such as the TIG welding. Each of the negative electrodes 18 may be made of a bar which is circular or rectangular in traverse cross section.

The welding of the coil ends 16b will also be described in detail with reference to FIGS. 8(a) to 14. FIGS. 8(a) and 8(b) are top views which illustrate the arrays of the coil end pairs 16c lying above one of opposed end surfaces of the stator core 14. FIGS. 9 to 13 are partial side views of the stator 20 to show a sequence of welding steps.

Figure 4:
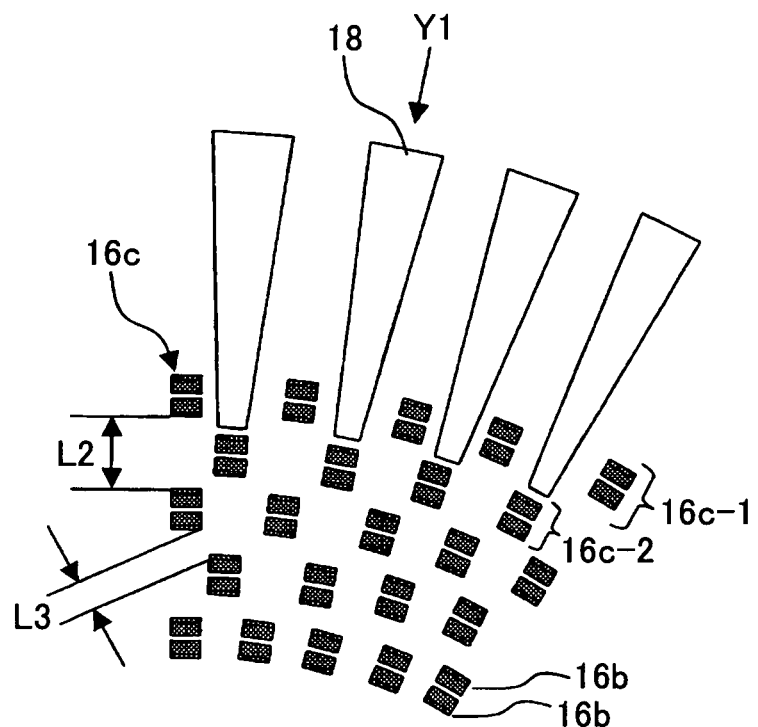
FIG. 4 is a partially enlarged view which shows the layout of coil ends of a stator winding of the stator of FIG. 1 which are to be welded.
Figure 9:
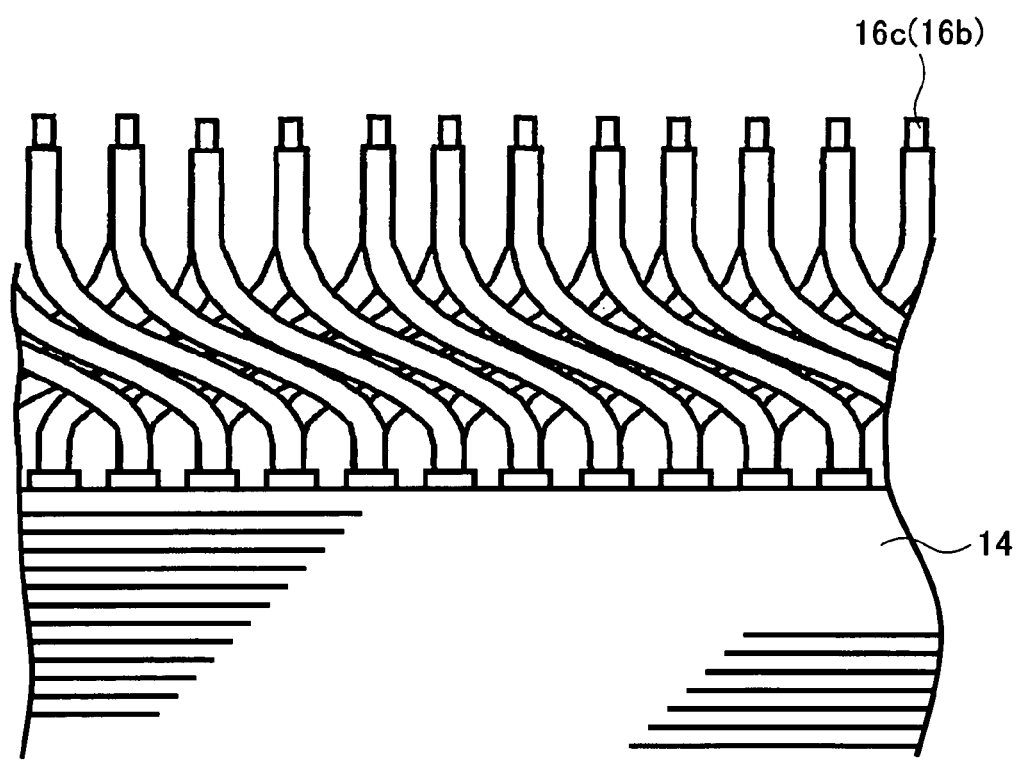
FIGS. 9, 10, 11, 12, 13, and 14 are partially side views of the coil ends of FIG. 5 for explaining a sequence of welding steps to weld the coil ends.

The coil end pairs 16c are, as illustrated in FIG. 9, arranged on the end surface of the stator core in the zigzag alignment, as described above. The zigzag alignment, as already discussed in the introductory part of this application, results in increases in distance L2, as illustrated in FIG. 4, between two of the coil end pairs 16c which are located adjacent each other in the radial direction of the stator core 14 and distance L3 between adjacent two of the coil end pairs 16o of the circumferentially extending arrays, which ensures a desired magnitude of electrical insulation between the adjacent coil end pairs 16c when being welded.

Figure 10:
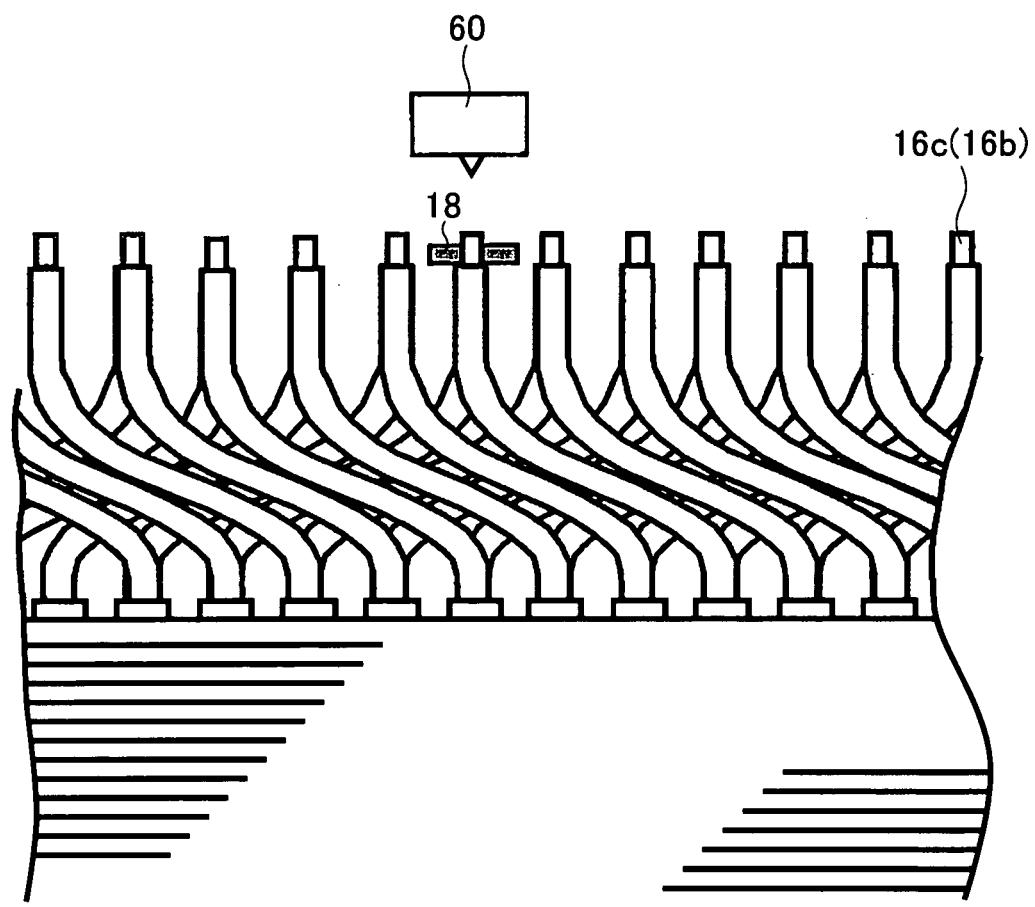

First, the negative electrode 18 connected to ground is, as illustrated in FIGS. 8(a) and 10, inserted fully into the gap between adjacent two of the diagonal arrays of the coil end pairs 16c in contact abutment with at least one of these two diagonal arrays. The negative electrode 18 may be made to have the width greater than the gap between the diagonal arrays, so that it is placed in contact with both the adjacent diagonal arrays.

Similarly, the negative electrodes 18 are inserted in sequence into all the remaining gaps. Each of the diagonal arrays of the coil end pairs 16c may be, as illustrated in FIG. 10, held between the two negative electrodes 18.

Figure 11:
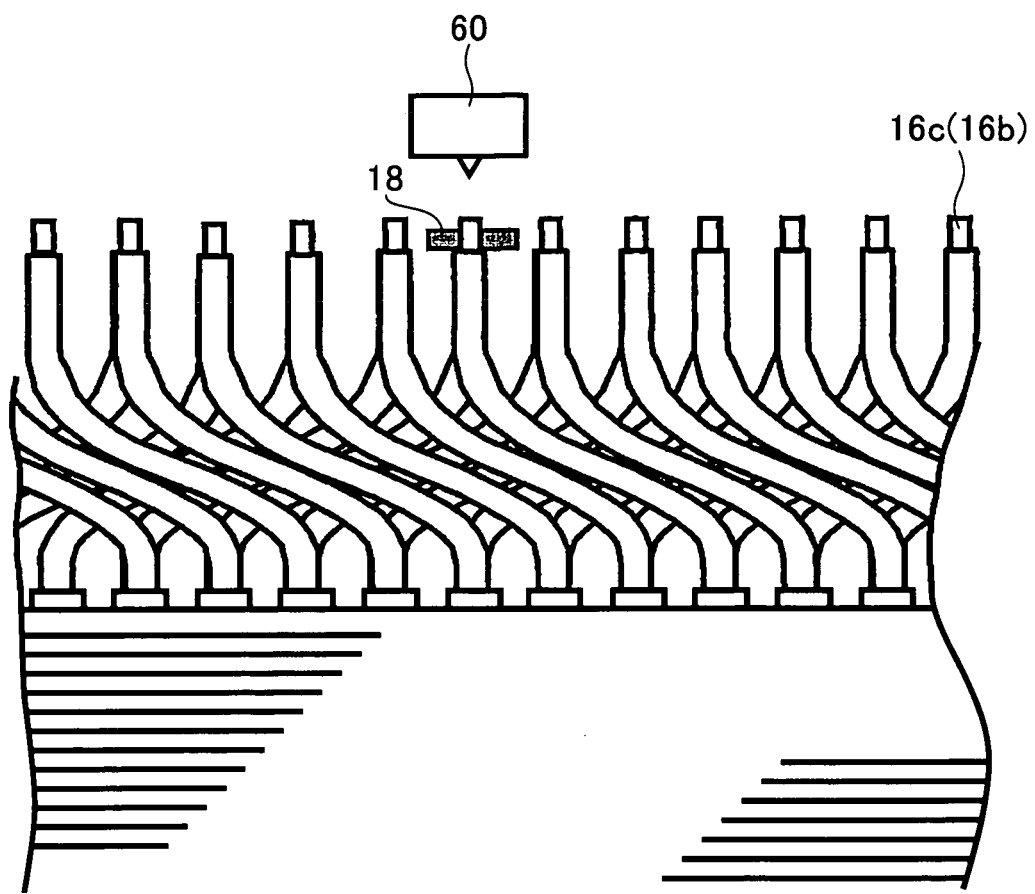

The positive electrode 60 is, as illustrated in FIGS. 8(b), 10 and 11, brought close to one of the diagonal arrays of the coil end pairs 16c from above.

Figure 12:
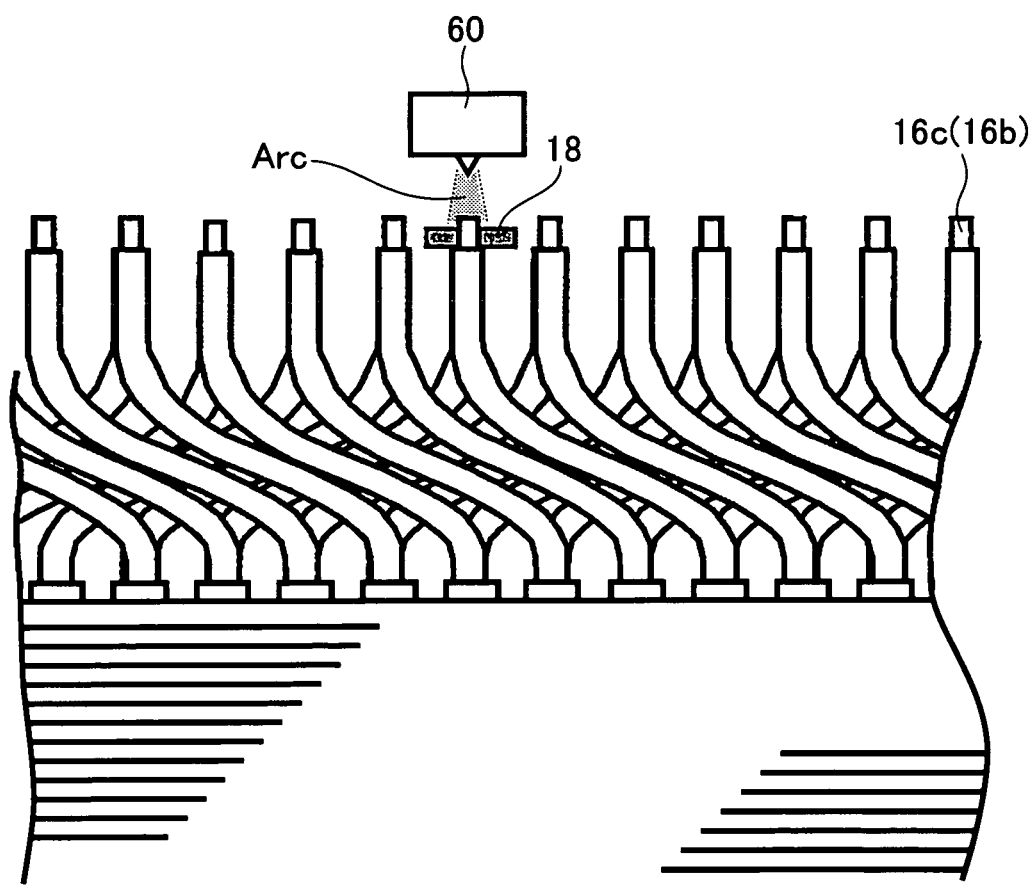
Figure 13:
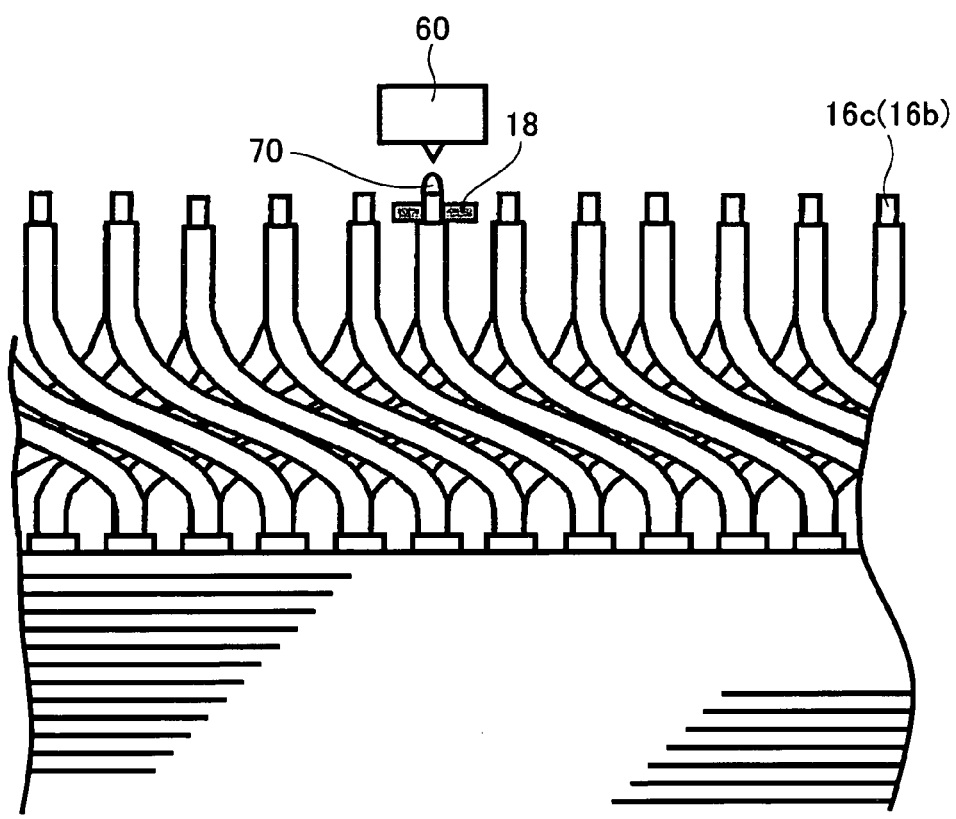
Figure 14:
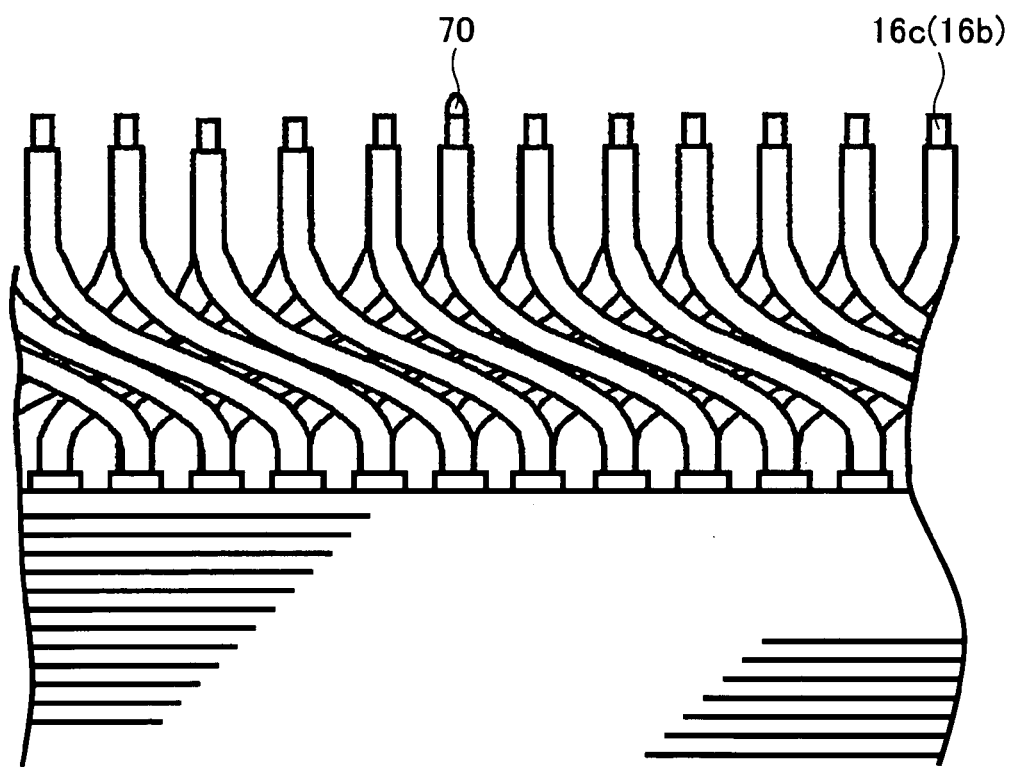

An electric arc, as illustrated in FIG. 12, is produced between the positive electrode 60 and each of the coil end pairs 16c of the one of the diagonal arrays, thereby making welds 70, as illustrated in FIG. 13, simultaneously on all the coil end pairs 16c of the diagonal array, FIG. 14 shows the weld 70 of the coil end pair 16c where the positive electrode 60 and the negative electrodes 18 are removed.

After the completion of welding of all the coil end pairs 16c of one of the diagonal arrays, the stator core 14 is rotated until the next diagonal array is below the positive electrode 60. The arcs are then produced between the positive electrode 60 and the coil ends 16b of the next diagonal array to weld the coil ends 16b.

The above steps are repeated to weld the coil ends 16b of all the diagonal arrays.

All the diagonal arrays of the coil end pairs 16c may alternatively be welded in sequence using a combination of the single negative electrode 18 and the single positive electrode 60.

Each of the diagonal arrays may extend straight at a given angle to the radial direction of the stator core 14 or as illustrated in FIG. 5, be curved slightly. In the latter case, the negative electrodes 18 are preferably made to be curved with the same radius of curvature as that of the diagonal array.

Figure 6:
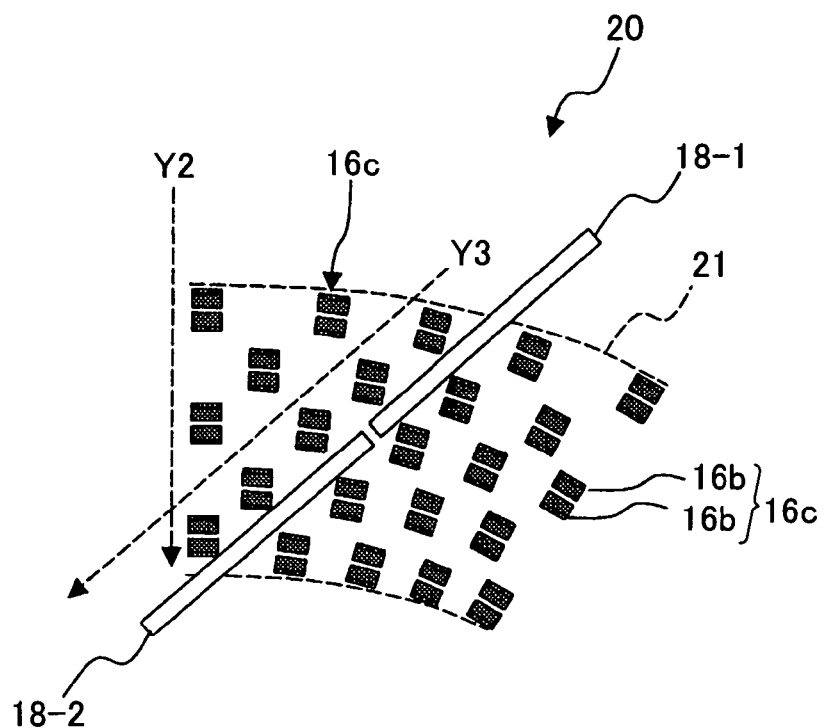
FIG. 6 is a partially enlarge view which shows a modification of a welding method of welding the coil ends of FIG. 5.

FIG. 6 illustrates a modification of the above welding method of welding the coil end pairs 16c of the stator windings 21. The welding of the coil ends 16b of the U-shaped conductors is made using a combination of two negative electrode 18-1 and 18-2 instead of each of the negative electrodes 18. Each of the negative electrodes 18-1 and 18-2 may be made of a strip which is circular or rectangular in transverse cross section. The length of each of the negative electrodes 18-1 and 18-2 is half the length of the negative electrode 18. The welding of the coil ends 16b is achieved by inserting the negative electrode 18-1 from outside the stator core 14 into the gap between adjacent two of the diagonal arrays of the coil end pairs 16c until it reaches the middle of the gap, also inserting the negative electrode 18-2 from inside the stator core 14 until it reaches the middle of the gap so that it is aligned with the negative electrode 18-1 within the gap, placing other combinations of the negative electrodes 18-1 and 18-2 in the remaining gaps in sequence in the same manner, and bringing the positive electrode 60 close to one of the diagonal arrays of the coil end pairs 16c to develop arcs to weld them together. The stator core 14 is rotated in the same manner, as described above, to weld all the diagonal arrays of the coil end pairs 16c. The use of the combination of the negative electrodes 18-1 and 18-2 facilitates the ease of placing them in each of the gaps between the diagonal arrays of the coil end pairs 16c.

Figure 7:
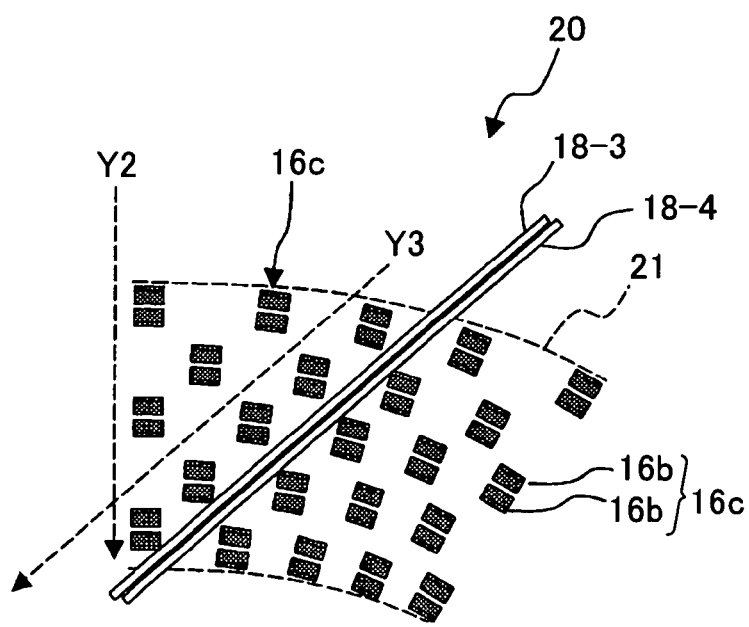
FIG. 7 is a partially enlarged view which shows another modification of a welding method of welding the coil ends of FIG. 5.

FIG. 7 illustrates the second modification of the above welding method of welding the coil end pairs 16c of the stator windings 21.

A combination of two discrete negative electrodes 18-3 and 18-4 is used instead of each of the negative electrodes 18. Each of the negative electrodes 18-3 and 18-4 may be made of a strip which is circular or rectangular in transverse cross section. The negative electrodes 18-3 and 18-4 are identical in structure with each other and have a diameter or width that is substantially half that of the negative electrode 18. The placing of the combination of the negative electrodes 18-3 and 18-4 in each of the gaps between the diagonal arrays of the coil end pairs 16c is achieved by inserting the negative electrodes 18-3 and 18-4 one by one from outside the stator core 14 until they pass through the innermost array (i.e., the fifth array 55) of the coil end pairs 16c. The welding of the coil ends 16b is achieved in the same manner as described above, and explanation thereof in detail will be omitted here.

A combination of three or more discrete negative electrodes may alternatively placed in each of the gaps between the diagonal arrays of the coil end pairs 16c to weld the coil ends 16b together. The use of a combination of a plurality of discrete negative electrodes facilitates the ease of placing it in each of the gaps between the diagonal arrays of the coil end pairs 16c.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A method of welding a plurality of conductors to form a winding extending through an annular stator core, the conductors being inserted into slots formed in the stator core to have coil ends extending outside one of opposed end surfaces of the stator core, a plurality of pairs of the coil ends being arranged in a circumferential direction of the stator core and also staggered in zigzag alignment in a circumferential direction of the stator core so as to form diagonal arrays of the pairs of the coil ends, each of the diagonal arrays extending diagonally with respect to the radial direction of the stator core, the method comprising:

inserting a first electrode of a welding system into a gap between adjacent two of the diagonal arrays; and bringing a second electrode close to one of the adjacent two of the diagonal arrays to weld the pairs of the coil ends, wherein the pairs of the coil ends are arranged in the circumferential direction of the stator core in coaxial circular arrays, and the pairs of the coil ends of each of the coaxial circular arrays are disposed at regular intervals to have the diagonal arrays located at regular intervals away from each other in the circumferential direction of the stator core; and wherein three or more pairs of the coil ends are also arranged in the radial direction of the stator core so that three or more radial arrays of the coil end pairs are respectively aligned to extend in the radial direction of the stator core.

2. A method as set forth in claim 1, wherein the first electrode is made of two discrete electrode strips, and one of the electrode strips is inserted into the gap from outside the stator core, while the other electrode strips is inserted into the gap from inside the stator core in alignment with the one of the electrode strips.

3. A method as set forth in claim 1, wherein the first electrode is made of two discrete electrode strips, and the two electrode strips are inserted into the gap so that they are disposed substantially parallel to each other.

4. A method as set forth in claim 1, wherein each of the diagonal arrays is curved at a given radius of curvature, and wherein the first electrode is curved at the given radius of curvature.

5. A method as set forth in claim 1, wherein each of the diagonal arrays extend straight, and wherein the first electrode extends straight.

6. A method as set forth in claim 1, wherein the first electrode has a width greater than those of the gaps, so that the first electrode is placed in contact with both adjacent two of the diagonal arrays.

7. A method as set forth in claim 1, wherein the first electrode is a negative electrode and the second electrode is a positive electrode.

8. A method as set forth in claim 1, wherein the second electrode is brought close to one of the adjacent two of the diagonal arrays to arc-weld the pairs of the coil ends.

9. A method as set forth in claim 1, wherein the first electrode is a bar having a circular or rectangular cross section.

\* \* \* \* \*